United States Patent

Hunt

[15] 3,705,701
[45] Dec. 12, 1972

[54] SAFETY MOTOR MOUNT

[72] Inventor: Theodore C. Hunt, 1109 Tumlin Street N. W., Atlanta, Ga. 30318

[22] Filed: Nov. 11, 1971

[21] Appl. No.: 197,813

[52] U.S. Cl. ................................ 248/9, 180/64 R
[51] Int. Cl. ............................................. F16m 5/00
[58] Field of Search......180/64 R; 267/153; 248/3, 5, 248/6, 7, 8, 9, 10, 15

[56] References Cited

UNITED STATES PATENTS

| | | | |
|---|---|---|---|
| 2,953,336 | 9/1960 | Etchells | 248/9 |
| 3,565,373 | 2/1971 | Frye | 248/15 X |
| 3,548,964 | 12/1970 | Krauss | 180/64 R |
| 3,556,445 | 1/1971 | Werner | 248/7 |
| 2,202,940 | 6/1940 | Armington | 248/22 X |
| 2,767,977 | 10/1956 | Raton | 248/10 X |

Primary Examiner—J. Franklin Foss
Attorney—Patrick F. Henry

[57] ABSTRACT

A safety motor mount for resiliently mounting the engine of certain automobiles on the frame in such a way as practically to eliminate the chance of complete detachment of the mount which may cause jamming of the accelerator or other serious difficulties. The existing motor mount which comprises a U-shaped base on which is attached a block of rubber bonded thereto and also having bonded thereon a steel plate has been modified to include another, larger U-shaped member passing around the outside of the motor mount and being held in place by the same bolt which passes through the original U-shaped member. When the engine lifts on the motor mount the rubber lock is deformed only a limited amount due to the restriction of the present modification and if the rubber block breaks or separates the present U-shaped member prevents complete detachment.

3 Claims, 2 Drawing Figures

PATENTED DEC 12 1972　　　　　　　　　　　　　　　3,705,701

INVENTOR
THEODORE C. HUNT
BY Patrick F. Henry
ATTORNEY 3,705,701

SAFETY MOTOR MOUNT

BACKGROUND OF THE INVENTION

1. Field of the Invention

Internal combustion engines and mounts and supports therefor. Motor mounts and motor supports.

2. Description of the Prior Art

Since the present motor mount is a modification and improvement on a previous motor mount the prior art comprises the U-shaped base which is attached by a transverse bolt to some part of the vehicle frame beneath the engine and a large block of resilient rubber bonded thereto and which rubber block has an engine attachment plate bonded thereto on the side opposite from the U-shaped member whereby the U-shaped member is attached to the vehicle frame and the other plate is attached to the engine mount so that the attachment is through the bonded rubber block. As the engine accelerates the momentum resulting from the torque causes the rubber block to stretch and it can rupture and has been known to do so in certain model automobiles. When this happens it is possible that the accelerator mechanism will be jammed and the automobile will run full speed without any control over the acceleration by the operator. The problem here is one of permitting the proper amount of resiliency and relative motion between the frame and the engine through the rubber block but preventing any complete separation and preferably preventing abnormal stresses which might take place in the block causing fractures that ultimately separate. A further problem is the number of such mounts presently in existence and the cost of modifying these in a suitable manner to prevent failure.

summary of the Invention

By modifying the previously described motor mount to include a U-shaped member which attaches with the usual bolt on the motor mount to the frame and extends around the outside of the motor mount a suitable amount of clearance can be left between the plate of the motor support and the inside surface of the U-shaped member to permit expansion and deformation but to stop same from reaching a critical point. Through the use of a U-shaped member which can be attached to the pre-existing parts without modification it is possible to accomplish the safety strengthening of the motor mount without significant expense. Furthermore, it is unnecessary to modify the basic motor mount which avoids the expense of tooling and production.

An object of this invention is to provide a quick and easy modification of an existing motor mount to make it safer and more dependable. Another advantage of the present modification of the motor mount is the simplicity and inexpensiveness thereof and the easy installation to provide a safety mount.

DESCRIPTION OF THE PREFERRED EMBODIMENT

Figure 1:
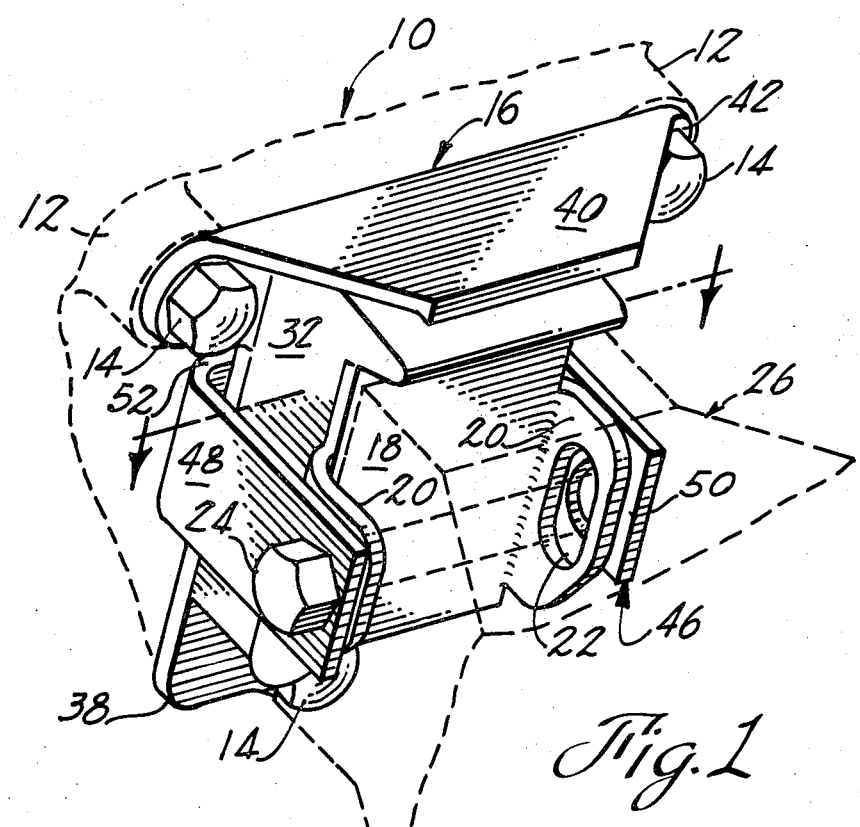
FIG. 1 is a perspective view of a typical motor mount with the frame and engine shown in dotted lines and the present modification installed thereon.

In FIG. 1 a typical engine is shown in dotted lines in section by reference numeral 10 and includes tapped housings 12 which receive mounting bolts 14 of an engine mount designated generally by 16 and which comprises the following conventional parts pre-existing in the art: a base plate 18 is substantially U-shaped in the middle and includes depending portions 20 having elongated bolt holes 22 in which is mounted the motor mount attachment bolt 24 fitting through a large box portion of the vehicle frame 26 which has suitable holes therein to receive the bolt 24. Bolt 24 is held in place by a washer 28 and a nut 30. A large block of rubber 32 is bonded to the base 18 by well known bonding process and the block 32 has bonded thereto on the other side a large plate 38 having a flange 40 and bolt holes 42 through which the bolt 14 is mounted to the tapped portions 12 on the engine 10.

Figure 2:
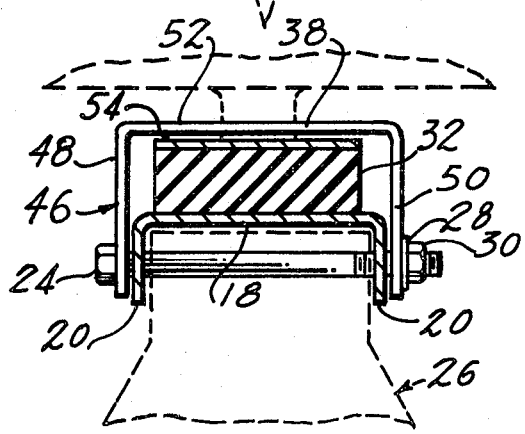
FIG. 2 is a cross-sectional view taken substantially along lines 2—2 in FIG. 1.

The present modification which is applied to the afore-mentioned structure without revision thereof comprises a U-shaped, steel member designated generally by reference numeral 46 and having depending sides 48, 50 each with a bolt opening receiving the bolt 24 therethrough and mounting same to the respective portions 20 of the base 18 and member 46 has a transverse plate portion 52 which goes across and is spaced from the plate 38 on the block 32 leaving a space which is designated by reference numeral 54 in FIG. 2.

when the engine 10 accelerates and torque increases the engine rises from the motor mount 16 and this exerts a considerable amount of force on the rubber block 32 stretching it away from its bonded portion on the base plate 38. As seen in FIG. 2 the stretching of the rubber block 32 is limited by the present invention to the amount of space designated at 54 which prevents abnormal forces on block 32 that would have occurred previously. Therefore, the block 32 is allowed to be distorted and pulled but is limited in motion and if there is a complete separation or rupture of the block 32 in between plate 18 and plate 38 the engine 10 is still attached to the frame 26 by means of the present U-shaped member 46.

While I have described and shown a particular embodiment of this invention in connection with a certain type of engine and frame this is by way of illustration only since there are many engines and many frames to which the present motor safety mount may be applied and there are various other modifications, alterations, changes, deviations, amendments, omissions, departures, and changes which may be made in the embodiment shown without departing from the scope of my invention as defined in the appended claims.

I claim:

1. In a safety motor mount wherein the motor mount includes a base mounting plate for attachment by a bolt to the vehicle frame and a block of rubber carrying an attachment plate bolted to the engine, and wherein said block of rubber is bonded to said base plate and said attachment plate, the improvement comprising:

a. a means extending from the attachment to the vehicle frame around the outside of the rubber block and across the attachment plate attached to the engine, said means being held in place by the attachment bolt which mounts the engine mount to the frame out of engagement with the attachment plate and substantially ineffective under normal operating conditions until said rubber block is displaced beyond safe conditions at which time said means engages said attachment plate to restrain said rubber block and prevent said rubber block from permitting unsafe movement between said engine and vehicle frame.

2. The motor mount in claim 1: said means comprising a one-piece U-shaped metal member.

3. The motor mount in claim 2: said U-shaped member having holes therein for mounting.

* * * * *